United States Patent [19]
Evans

[11] 4,294,492
[45] Oct. 13, 1981

[54] CALIPER SEAL ASSEMBLY

[76] Inventor: Robert F. Evans, 631 Honeywood La., La Habra, Calif. 90631

[21] Appl. No.: 153,540

[22] Filed: May 27, 1980

Related U.S. Application Data

[63] Continuation-in-part of Ser. No. 95,532, Nov. 19, 1979, Pat. No. 4,240,674.

[51] Int. Cl.³ .............................................. F16C 33/74
[52] U.S. Cl. .................................... 308/8.2; 308/187.1
[58] Field of Search .................. 308/8.2, 73, 160, 215, 308/187.1, 187.2; 175/371, 372

[56] References Cited

U.S. PATENT DOCUMENTS

| | | |
|---|---|---|
| 2,192,305 | 3/1940 | Gilman . |
| 2,373,860 | 4/1945 | Torresen . |
| 2,705,164 | 3/1955 | Dasse . |
| 3,442,516 | 5/1969 | Voitek . |
| 4,240,674 | 12/1980 | Evans ..................................... 308/35 |

*Primary Examiner*—Lenard A. Footland
*Attorney, Agent, or Firm*—John R. Ley

[57] ABSTRACT

A caliper seal assembly is adapted to seal two relatively moving parts in a drilling tool or drill bit or other device where a sealing relationship must be maintained under relatively large relative position and tolerance changes between the two movable parts, under relatively rapid pressure variations and surges, and under relatively high temperature conditions. The caliper seal includes a pair of flexible flank members having contact pads formed thereon and between which sealing surfaces of a flange-like projection extend. The caliper seal is particularly advantageous for sealing bearing assemblies between a cutter wheel and the body of a rotary drill bit. A heat pipe assembly can be incorporated within the flange-like projection to remove excess heat generated by the frictional contact of the contact pads on the flange sealing surfaces. The flange projection can also be formed with an interior fluid conducting conduit to remove excess heat. The seal assembly may be operatively connected to be moved in conjunction with an intermediate moving element carried between or positively indexed with respect to two relatively moving raceways of a bearing assembly. In combination with a compensator assembly, the caliper seal provides an improved lubricating system in a drill bit or drilling tool.

20 Claims, 21 Drawing Figures

CALIPER SEAL ASSEMBLY

BACKGROUND OF THE INVENTION

This invention, in the respects hereinafter appearing, is a continuation in part of U.S. Patent Application Ser. No. 95,532, filed Nov. 19, 1979 by the Inventor herein, now U.S. Pat. No. 4,240,674.

The present invention relates to seal assemblies, and particularly to a type of seal assembly referred to herein as a caliper seal assembly. The invention further pertains to the improved application of seal assemblies in equipment and tools operated in uniquely deleterious and adverse environments, such as those present in the drilling of boreholes in earth formations.

It is well recognized that the environment in which an earth drilling tool must operate is extremely severe. The nature and extent of the adverse influences make the earth drilling environment virtually unique as to the requirements placed on the various operational components of the earth drilling tools.

Drilling tools are generally operated until they become excessively worn or until they fail. It is not economically feasible to replace slightly worn drilling tools because to do so requires a considerable expenditure of time and resources to completely remove the very lengthy drill string from the borehole to gain access to the drilling tool connected at or near the bottom end of the drill string. Consequently, it is very important that the drilling tools experience a justifiable and reasonable lifetime of use before failing or becoming excessively worn.

One of the elements in a drilling tool such as a rotary drill bit which is critically important in preventing premature failure or wear is a seal assembly. A seal assembly typically acts as a barrier between two different environments and is consequently required to withstand the various deleterious effects from both of the environments. In earth drilling tools the seal assembly is typically utilized to contain lubricant within a bearing assembly between two relatively moving parts and to shield the bearing assembly and the lubricant from an exterior ambient environment of drilling fluid and very abrasive earth formation particle cuttings, the combination of which is known a mud. Failure of the seal assembly to prevent the excessive loss of lubricant, or to prevent the ingress of the corrosive drilling fluid and abrasive particle cuttings will certainly result in the premature failure of the bearing assembly and hence, the drilling tool.

The requirements of the seal assembly in a drilling tool are compounded by the adverse effects in the drilling environment. The typical application for a seal assembly is to seal the rotary cutting wheel to the body of a drill bit. It is not uncommon in a typical drilling process that a static load or weight of from 40,000 to 70,000 pounds will be applied to three cutter wheels of a drill bit less than nine inches in diameter. Regularly occuring intermittent shock loads present during the drilling process will fluctuate the static load as much as 25% but peak shock loads of approximately 350% of the static load have been observed. After a relatively short period of use under these conditions, the cutter wheel, the bearing shaft and the bearing assembly experience wear. The wear is normal and expected, but the resulting dimensional changes, tolerance changes and relative position changes of the various moving elements creates special requirements for the seal assembly. As the relative positions and tolerances change, the seal assembly must respond accordingly and maintain its sealing barrier despite these changes. The increased clearances also create complex relative movements of the cutter wheel on its bearing shaft, which include rapid axial and radial relative movements as well as wobbling motions. The magnitudes of these complex movements increase as the parts become increasingly worn. Even under these extreme conditions, the seal assembly must remain effective to isolate the lubricant and the bearing assembly from the deleterious ambient environment.

Pressure variations in the drilling fluid of the ambient environment of the drill bit occur simultaneously with the relative position and tolerance changes due to wear. Wobbling cutter wheel movement can create a pumping effect within the lubricant of the bearing assembly. Very high external pressures are created by the relatively high hydrostatic head of drilling fluid extending from the bottom of the borehole to the earth's surface, possibly many thousands of feet. Although the well known prior art compensator systems are successful in slowly equalizing the internal lubricant pressure to the exterior drilling fluid pressure, the seal assembly itself must compensate for rapid pressure fluctuations and surges resulting from vibration and shock on the drilling equipment, from a piston effect created by rapidly lowering the drilling tool downward through a drilling fluid-filled borehole and from the pumping effect created by wobbling of the cutter wheel. The inability of the compensator system to quickly equalize the internal lubricant pressure with the ambient pressure requires the seal assembly itself to compensate for ambient pressure variations in the realm of multiples of the internal bearing pressure.

The seal assembly must also remain effective in relatively high temperature environments. As the drilling progresses downward, the natural temperature of the earth formation typically increases. The considerable friction generated during the drilling process also rapidly heats the drill bit. When liquid is used as the drilling fluid, the continual circulation of the liquid drilling fluid around the drill bit generally sufficiently cools the drill bit and its connected bearing assembly. However, in air drilling where air is the drilling fluid, the capacity of air or a gas to remove heat from the drill bit is limited. The temperature of the drill bit increases substantially, and the typical operating temperatures of an air drilling bit usually preclude the use of seals in its bearings. Instead, a supply of air is continually forced through the bearing assembly to cool it, lubricate it and to prevent the entry of particle cuttings from the ambient environment. In geothermal drilling, the natural temperature of the earth formation is so sufficiently elevated that no type of prior art seal assembly for a liquid or gaseous drilling bit has proved effective for a reasonable period of time.

The unusually severe and adverse conditions present in the drilling environment have been the most successfully withstood by a prior art type of seal assembly employing an O-ring. Although other types of seals have been utilized and are known in the art, the O-ring seal is more effective. It is the primary intent and objective of the present invention to teach the unique application of a new and improved caliper seal assembly for use in earth drilling tools and in other equipment used in adverse environments or where an added measure of protection against less adverse environmental conditions is desired.

SUMMARY OF THE INVENTION

One aspect of the present invention pertains to a caliper seal assembly for use in combination with a rotary drill bit. The caliper seal assembly basically includes a structure having a bifurcated end and defining a pair of flexible flank members. A flange-like projection extends into a intermediate channel between the flexible flank members, and a contact pad formed on each flank member contacts and forms a relatively moving seal with sealing surfaces formed on the flange-like projection. The caliper seal assembly operatively extends between the cutter wheel and the bit body and seals the drill bit bearing assembly from the ambient environment of the bit. The caliper seal assembly remains highly effective during relatively large position and tolerance changes of the cutter wheel with respect to the drill bit. The relatively long and elastic flank members quickly respond to pressure surges without substantially altering the contacting sealing relation of the contact pads with the sealing surfaces of the flange projection. In combination with a compensator assembly, the caliper seal assembly more effectively and quickly equalizes the internal lubricant pressure with the ambient pressure, even under rapid pressure surges and fluctuations. Heat is rapidly dissipated by the flange projection. Different length flank members distribute the heat generated by the frictional movement of the contact pads on the sealing surfaces over an increased area of the flange projection.

Further aspects of the invention result in significant improvements in the heat conducting and resisting capability of a seal assembly. A heat pipe assembly or means may be effectively integrated within the interior of the flange-like projection. The heat pipe assembly very efficiently removes excess heat from the flange projection and conducts it to the heat sink inherently provided by the drill bit body. The flange-like projection can also be formed with an interior fluid conducting conduit. Cooling fluid flowing through the interior conduit of the flange projection removes the excess heat created by frictional contact of the contact pads with the flange projection. Employing a heat pipe in the flange projection or fluid cooling conduit in the flange projection are significant improvements in seal assemblies for bearings in general, and particularly in air and geothermal drill bits. The heat problems in air drilling have limited the success of air drilling bits utilizing sealed and lubricated bearings. In geothermal drilling, no prior art seal assembly has proved successful. The present invention offers substantial improvements in the air drilling, geothermal drilling and other high heat environment applications.

A further aspect of the present invention pertains to the use of a seal assembly with a positive indexing bearing assembly employing a relatively moving element positioned between the raceways of the bearing assembly. A caliper seal assembly can effectively be incorporated for use in a positive indexing bearing assembly with the structure defining the flexible flank members being carried by or with the intermediate relatively moving element. Other types of seal structures are also effective as intermediate relatively moving sealing structures. By moving the intermediate sealing structure relative to both relatively moving raceways, the heat generated from the relative movement of the sealing elements is diminished and the life of the seal is increased at higher bearing operating speeds.

A more complete understanding of the improved features and aspects of the present invention can be obtained from the following description, drawings and appended claims.

DESCRIPTION OF THE PREFERRED EMBODIMENTS

Figure 1:
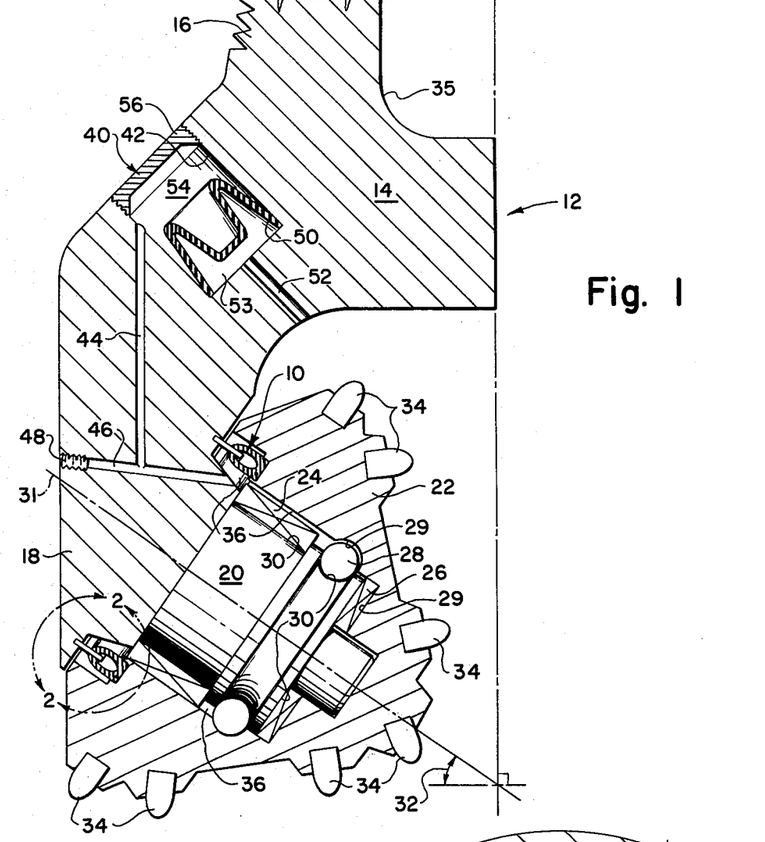
FIG. 1 is a fragmentized and cross sectioned side view of the left-hand half of a drill bit to which one embodiment of a caliper seal assembly according to the present invention is adapted.

One embodiment 10 of a caliper seal assembly according to the present invention is shown in FIG. 1 in use with a rotary drill bit 12. The drill bit 12 can be of the well-known three cone variety which includes a bit body 14 having a threaded shank portion 16 and a leg portion 18. The drill bit 12 is threadably connected to the lower end of a drill string (not shown) by the threaded shank 16. A journal shaft or pin 20 extends from the leg portion 18 into a hollow interior of a rotary cone-like cutter wheel 22. The cutter wheel 22 is rotatably connected to the journal pin 20 by bearing means. A variety of different bearing assemblies may be incorporated in the drill bit 12 and utilized with the present invention, however a radial or rotary bearing assembly 24, an axial or thrust bearing assembly 26, and a ball bearing assembly 28 are illustrated. The bearing assemblies 24, 26 and 28 are well known in the art. The bearing assemblies 24, 26 and 28 are operative between raceway surfaces 29 formed on the interior surface of the cutter wheel 22 and raceway surfaces 30 formed on the exterior surface of the journal pin 20. The journal raceway 30 is preferably concentric about an axial reference 31 extending through the journal pin 20 at a journal angle 32. When new and in the early stages of use, the cutter wheel raceway 29 also rotates concentrically about the axial reference 31. However, after wear and use, the axis of rotation of the cutter wheel shifts slightly upward from the axial reference 31, and the cutter wheel moves slightly axially along the reference 31 upward and to the left, as shown in FIG. 1. These relative changes in positions and tolerances are well known and result primarily because of the journal angle and continual upward force on only the lower rotational portion of the cutter wheel as it contacts the earth formation during the drilling process. Of course, the cutter wheel 22 includes a plurality of very hard cutter inserts 34 which cut, scrape and grind the earth formation during the drilling process. The particle cuttings thus removed from the earth formation are carried upward out of the borehole by drilling fluid which is forced downward through an open center conduit in the drill string and into a center cavity 35 in the drill bit. The drilling fluid is expelled from the cavity 35 through wash jets (not shown) onto the drill face of the borehole and carries the particle cuttings upward through the annular space exterior of the drill string within the borehole.

The bearing assemblies 24, 26 and 28 are sealed from the ambient environment of drilling fluid and particle cuttings by the caliper seal assembly 10. The caliper seal assembly 10 operatively extends between the bit body leg portion 18 and the cutter wheel 22 and seals the interior space 36 between the interior surfaces and raceways 29 of the cutter wheel 22 and the exterior surfaces and raceways 30 of the journal pin 20. Lubricant is initially forced into the bearing assemblies 24, 26 and 28 and into all the remaining unoccupied open space 36. The space 36 thus defines a lubricant cavity for and surrounding the bearing assemblies 24, 26 and 28.

A compensator assembly 40 is provided for replenishing the supply of lubricant in the lubricant cavity 36 and for generally equalizing the pressure of the lubricant within the sealed cavity 36 with the ambient pressure exterior to the drill bit 12. The compensator assembly 40 is well known in the art. A pocket 42 is formed into the bit body 14. Various passageways 44 and 46 are formed or drilled from the pocket 42 to the lubricant cavity 36. Plugs 48 seal any exterior openings of the passageways, thereby forming a closed passageway from the pocket 42 to the lubricant cavity 36. A flexible diaphragm 50 is positioned at one end of the pocket 42. A vent opening 52 extends from the space 53 in the pocket 42 on one side of the diaphragm 50 to the exterior of the drill bit body 14. Lubricant is placed in the pocket 42 in space 54 on the other side of the diaphragm 50, and is also inserted into the passageways 44 and 46, into the lubricant cavity 36 and into the bearing assemblies. An exterior cap 56 is forced and sealed into the outer end of the pocket 42, thereby completing a closed lubricant containing volume between the flexible diaphragm 50 and the caliper seal assembly 10. The vent 52 pressurizes the space 53 to the ambient pressure, and the ambient pressure tends to collapse the flexible diaphragm 50 toward the cap 56 until the internal pressure of the lubricant equals the ambient pressure.

The compensator system and assembly 40 prevents the seal assembly from destructively collapsing and breaking the lubricant seal under the influence of slowly changing ambient pressures. By equalizing the internal lubricant pressure with the ambient pressure, no significant differential force is applied to the seal assembly. One example of a radical pressure change is that which occurs between the surface of the earth and the bottom drill face of a deep borehole. A considerable head of drilling fluid extends from the drill face upwardly to the earth's surface, which may be many thousands of feet, and the head of drilling fluid creates considerable ambient pressure at the drill bit. The compensator system slowly pressurizes the lubricant an equal amount and prevents the seal assembly from collapsing or experiencing continued deformation into an unintended orientation or position.

Although the compensator assembly and system is capable of equalizing slowly changing pressures, it is not capable of immediately compensating for rapidly changing pressure variations or surges. One type of rapid pressure variation occurs as the drill bit is lowered into a drilling fluid-filled borehole. The resulting piston effect causes a rapid build-up of pressure. The article "Well Bore Pressure Surges Produced by Pipe Movement" in the *Journal of Petroleum Technology* of June, 1961 describes the pressure surges produced by pipe movement. Another source of rapid pressure variations occurs naturally during the drilling process due to mechanical vibrations. Periodic pressure shocks are induced by mechanical vibrations of the drilling tools, and the periodic nature of the pressure variations sometimes causes a pumping action on the seal assembly which increases and decreases the pressure on the seal assembly with respect to the average exterior pressure. The article "New Drilling Research Tool Shows What Happens Down Hole" in the *Oil and Gas Journal* of Jan. 8, 1968, page 55 describes the pressure shocks and variations which can result in the drilling process.

The seal assembly itself must withstand the rapid pressure surges. Prior art O-ring seals compensate for rapid pressure variations by rolling or sliding toward and away from the lubricant cavity. The sliding motion unnecessarily wears the O-ring seals and causes excessive lubricant leakage. Other types of prior art seals can not adequately maintain the sealing relationship under the pressure variations, and simply expel lubricant to the ambient environment or pass drilling fluid and particle cuttings to the bearing assemblies.

The relative mechanical displacement of the parts from wear during use and the rapid pressure variations are only a few of the unique and highly adverse effects which the seal assembly must successfully withstand for a reasonable period of use. Seal deterioration from heat build-up is also a significant problem, particularly in air drilling and in geothermal drilling. The heat problem is so significant in air drilling that the typical air drill bit does not utilize lubricated sealed bearings, but instead, employs air forced through the bearing assembly to act as a coolant and lubricant. In geothermal drilling, the earth formation is naturally at a highly elevated temperature and adds heat to the drill bit. The quantity of heat present in geothermal drilling is so significant that, at the present time, no known seal assembly for lubricated bearings has proved successful for a reasonable lifetime of use in geothermal drill bits. Lastly, the space available in most drilling tools in which to employ seals is critically limited because the size of the tool is uniquely limited by the standard diameter or gage of the borehole. Structural tool designs must balance space utilization between the strength and function of the components. The size of the physical sections is minimal and elastic deformations and flexures are extreme when compared to other less restricted applications where space limitations are not critical.

It is highly important that the seal assembly withstand as many of the adverse effects for as long as possible. Failure of the seal assembly results in rapid failure of the drill bit. Once a drill bit has failed or becomes ineffective the long drill string must be removed from the borehole to replace the bit. Removing the drill string requires substantial time and expense, so it is critically important that the drill bit perform its function for a reasonably extended period of time.

The caliper seal embodiments of the present invention offer substantial improvements over widely used prior art seals in the field of drilling tools, particularly in responding to those adverse effects of relative displacement during use, pressure variations, heat dissipation and a variety of other problems and adverse effects unique to the drilling environment and many other applications.

Caliper Seal Features

Figure 2:
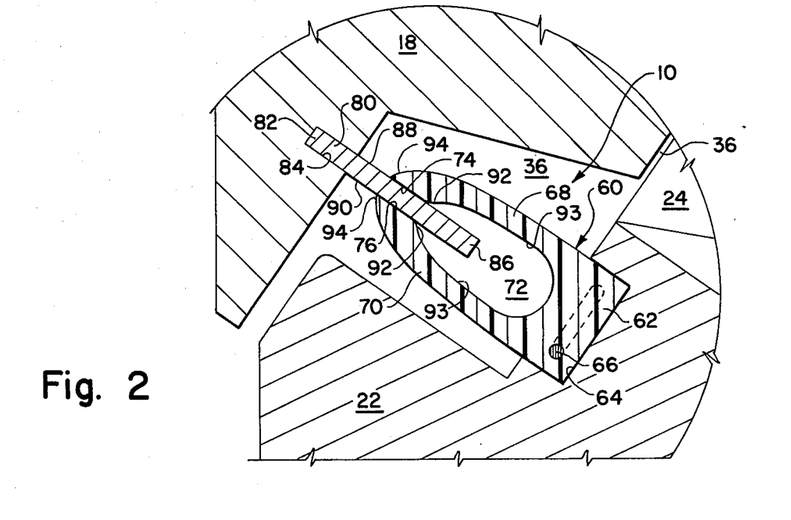
FIG. 2 is an enlarged view of the portion of FIG. 1 generally bounded by line 2—2.

Details of the caliper seal assembly 10 shown in FIG. 1 are best seen in FIG. 2. Generally, the assembly 10 comprises a support structure 60 having one end 62 sealingly and firmly retained in a correspondingly shaped annular groove 64 in one of two relatively movable parts, for example the cutter wheel 22. Preferably the support structure 60 is constructed of an elastomer material. A wave-spring 66 or other similar retaining means is fastened to or bonded into the support structure 60 for the purpose of firmly holding the end 62 in the groove 64. The operative connection of the structure 60 to the part 22 is fluid-tight to prevent the passage of fluid between the end 62 and the groove 64. A pair of flexible flank members 68 and 70 extend away from the retained first end 62 and define a bifurcated other end of the support structure 60. The flank members 68 and 70 are separated by an open intermediate or interior channel 72. Contact pad sealing surfaces 74 and 76 are respectively formed on the terminal ends of the flank members 68 and 70. Preferably the flank members and contact pads are formed of flexible elastomeric material.

The middle portion of the flank members 68 and 70, which extends between the contact pads 74 and 76 and the retained end 62, is relatively long and of relatively thin cross section to allow relatively easy flexure of the flank members. A uniform cross sectional configuration of the support structure 60 exists along its length, which will form a closed annular structure in the case of a rotary bearing. Although the structure 60 is shown as a single or unitary structure, the structure 60 may be formed by joining together a plurality of previously distinct elements which collectively provide the features herein described.

The caliper seal 10 also includes a flange-like annular projection 80 operatively connected to and extending away from the other movable part, for example the leg portion 18. A first or retained end 82 of the flange-like projection 80 is retained within a correspondingly-shaped annular groove 84 formed in the leg portion 18. Preferably the flange-like projection is constructed of metallic material and the end 82 is press-fitted, welded or otherwise permanently attached in the groove 84. The flange-like projection 80 is connected to the movable part in a fluid-tight manner to prevent the passage of fluid between the end 82 and the groove 84. A free end 86 of the flange-like projection 80 extends into the intermediate channel 72 and between the two contact pads 74 and 76 of the flank members 68 and 70. Sealing surfaces 88 and 90 are formed on opposite sides of the flange-like projection 80 between the retained end 82 and the free end 86. The sealing surfaces 88 and 90 are each preferably flat and smooth to operatively contact and form a relatively movable sealing relationship with the contact pad sealing surfaces 74 and 76 respectively. The free end 86 does not contact the flank supporting structure, thereby allowing an open path between the contact pads 74 and 76 within the intermediate channel.

The flexible flank members 68 and 70 of the structure 60 are biased toward one another and force the contact pads 74 and 76 into sealing engagement with the sealing surfaces 88 and 90 of the flange-like projection 80. The flank members are biased toward one another by internal residual forces within the elastomeric material created by separating the flank members sufficiently to receive the flange projection 86, by molding an internal resilient biasing means such as a spring element (not shown) into the flank members, or by other well-known means.

An inner edge portion 92 of each of the contact pads 74 and 76, which is oriented toward an innermost location within the intermediate channel 72, arcuately curves in a convex manner away from the sealing surfaces 88 and 90. An interior surface 93 of the flank members continues to extend away from the sealing surfaces 88 and 90 and curves away from and around the free end 86 of the flange 80. The arcuate curvature of the inner edge portion 92 assures that each contact pad will maintain a sealing relationship with the sealing surfaces 88 and 90 when the flank members flex laterally under rapid pressure fluctuations or conditions of change in the relative position of the movable parts. An exterior surface portion 94 of the flank members adjoining the contact pads 74 and 76 curves away from the sealing surfaces 88 and 90 at a sharp angle. The portion 94 defines a nose structure at the outer end of each bifurcated flank member, and this nose structure acts to clean the sealing surfaces 88 and 90 during certain types of relative movement of the flange-like projection 80 and the support structure 60. Removing abrasive particle cuttings from the sealing surfaces increases the life of the seal by maintaining the sealing surfaces 74, 76, 88 and 90 in a smooth condition.

The lubricant cavity space 36 is filled with lubricant, as well as the intermediate channel 72. A thin film of lubricant also extends between the contact pads 74 and 76 and the sealing surfaces 88 and 90, and this thin film creates the sealing relationship and lubricates the contact pads and sealing surfaces during relative movement. The channel 72 can be filled with lubricant before the flange-like projection 80 is inserted. In addition, lubricant from the cavity 36 is forced into the channel 72 from between the contact pad 74 and sealing surface 88 by the compensator system. During use, a small amount of the lubricant is expelled between the sealing surfaces 76 and 90, but this small escape of lubricant is desirable and assures a constant thin lubricant film will be present to maintain a proper sealing relationship. In fact, the life of the caliper seal assembly is significantly prolonged by a slight amount of lubricant leakage between the flange-like projection sealing surfaces and the contact pad sealing surfaces.

Figure 3:
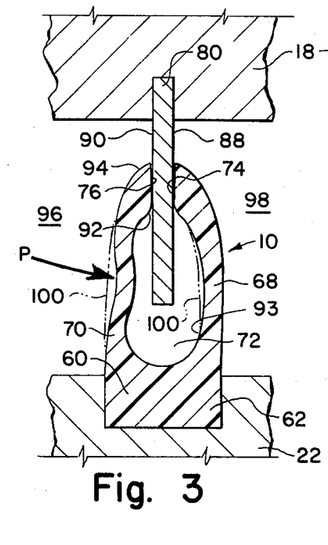
FIGS. 3, 4 and 5 are cross sectional views similar to the caliper seal assembly shown in FIG. 2 and illustrating various response characteristics of the seal assembly to different operating and environmental conditions.
Figure 4:
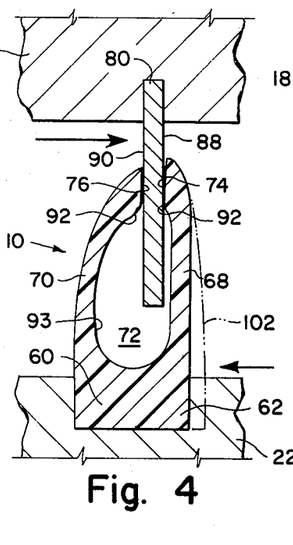
Figure 5:
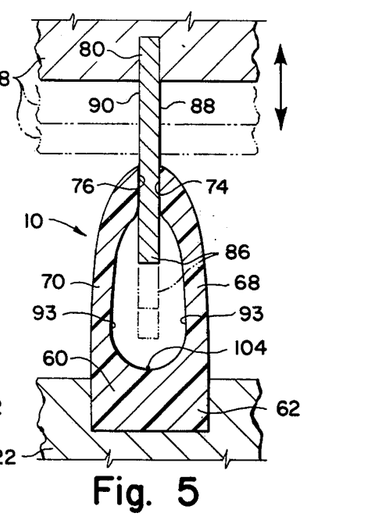

The advantages and improvements of the caliper seal assembly with respect to various adverse effects encountered are better understood by reference to FIGS. 3, 4 and 5.

The effects of radical pressure fluctuations are generally illustrated in FIG. 3. The caliper seal assembly 10 is shown to provide an effective barrier between environments 96 and 98 on opposite sides of the seal assembly 10. For example, a high pressure surge in environment 96 causes the relatively long thin flank members 68 and 70 to bow away from the direction of application of the pressure surge. The dotted lines 100 indicate the normal curvature of the flank members 68 and 70, and the solid lines indicate the deflection. The increased pressure on one flank member, e.g. 70, is transferred through the lubricant filled interior channel 72 to the other flank member, e.g. 68, thereby causing it to bow in a corresponding manner. The flank members bend or deflect until the internal lubricant pressure, e.g. within environment 98, is equalized to the ambient pressure surge, e.g. in environment 96. Because the relatively long flank members exhibit a relatively large exterior surface area in contact with the environment 96, and also because the lubricant which typically totally occupies the environment 98 will not compress substantially, the amount of bowing of the flank members is not great. Consequently, even when the flank members are bowed, the orientation of the contact pads does not depart from that which results in a sealing contacting relationship of the contact pads 74 and 76 with the sealing surfaces 88 and 90.

The convexly curved arcuate portion 92 along the inner edge of the contact pad 76 rolls slightly inwardly against the the sealing surface 90. The curvature of the portion 92 maintains the sealing relation of the contact pad 76 with the surface 90 during bowing and deflection of flank member 70 and tends to compensate for any slight movement of the contact pad 76 away from the sealing surface 90 in the area adjacent the nose portion 94. The slight rolling motion of the contact pad at the curved portion 92 minimizes any loss of lubricant during the accommodation of high pressure variations and assures that a portion 92 of the contact pad 76 remains in sealing engagement with the sealing surface 90.

Rapid pressure compensation is available from the caliper seal assembly. The relatively large surface area presented by the long flank members defines a significantly sized area upon which the pressure surges can act. The flexibility of the flank members and the relatively large pressure application area cooperatively equalize the pressures quickly without expelling significant amounts of lubricant or ingesting significant amounts of drilling fluid and particle cuttings. Rapid pressure compensation is in significant distinction to the prior art O-ring seals which are forced to roll or slide in order to compensate for rapid pressure changes. The rolling or sliding movement of the O-ring seal increases the probability that drilling fluid and particle cuttings will be forced into the lubricant. It should also be noted that the typical O-ring seal presents two contact sealing surfaces, each of which provides a direct communication channel between the lubricant within the bearing assembly and the ambient environment. In the caliper seal assembly, two dynamic sealing relationships are also maintained, but those sealing relationships are operatively connected in serial order between the ambient environment and the bearing assemblies. For drilling fluid and particle cuttings to reach the bearing assemblies in the caliper seal, the drilling fluid and particle cuttings must pass through the first sealing relationship defined by the contact pad 76 and the sealing surface 90 and then through the second sealing relationship defined by the contact pad 74 and the sealing surface 80. Thus, even if a small amount of drilling fluid and particle cuttings is forced past the first sealing relationship at the sealing surfaces 76 and 90, pressure equalization will occur before any of this adverse material passes through the channel 72 and the second sealing relationship defined between the contact pad 74 and the sealing surface 78. Of course, the caliper seal assembly 10 responds to a higher pressure surge in environment 98 in a manner essentially the same but opposite from that described and illustrated in FIG. 3.

FIG. 4 illustrates the beneficial sealing relationship achieved by the caliper seal assembly 10 during relative position changes of the movable parts 18 and 22 in a direction perpendicular to the extension of the flange-like projection 80. The cutter wheel 22 is shown shifted relatively to the left as compared to the bit body leg portion 18. The support structure 60 has been displaced by an amount apparent from dotted lines 102 which illustrate the aligned position shown in FIG. 2. In drill bits, such shifts typically occur as the drill bit is used and the bearing assemblies and raceways become worn. The axis of relative rotation of the cutter wheel shifts non-coaxially with respect to the axis of the journal pin. A discussion of the non-coaxial displacement of the cutter wheel on the journal pin and its effects is found in the aforementioned U.S. Pat. No. 4,240,674 (Ser. No. 95,532) of the Inventor herein, and in prior art references. The caliper seal assembly 10 maintains an effective and operative sealing relationship even during such relative position changes. By comparing FIGS. 3 and 4, it can be seen that relative position changes of the two movable parts 18 and 22 creates a situation somewhat similar to a pressure surge, except that the flank members 68 and 70 are not bowed between the contact pad ends and the retained end 62. The contact pads 74 and 76 and their convexly curved portions 92, maintain the sealing relationship with the surfaces 88 and 90 in much the same manner as during pressure surges. However, since the flank members 68 and 70 are not bowed during relative position shifts, the contact pads maintain angles more generally similar to the angles during the aligned relationship illustrated in FIG. 2. Of course, relative position shifts of the parts 18 and 22 in the direction opposite of that illustrated in FIG. 4 creates a similar sealing effect.

FIG. 5 illustrates the sealing relationship maintained by the caliper seal assembly 10 during relative position shifts of the movable parts 18 and 22 in a direction generally parallel to the flange-like projection 80, and in a direction virtually perpendicular to that direction of relative position change illustrated in FIG. 4. It is apparent that the contact pads 74 and 76 freely slide along the flange-like projection sealing surfaces 88 and 90 during the type of relative position change illustrated in FIG. 5. The extension of the flange-like projection 80 from its retained end 82 to its free end 86 is such that under the maximum amount of allowable movement the free end 86 does not contact the inner surface of the structure 60 within the intermediate channel 72. Similarly, the maximum amount of relative movement in the opposite direction does not withdraw the free end 86 from between the contact pads 74 and 76.

The pressure surge and relative movement effects described in FIGS. 3, 4 and 5 can occur simultaneously. However, the caliper seal will maintain a sealing relationship even under the simultaneous application of the various adverse effects. A number of important features of the caliper seal assembly contribute to maintaining the sealing relationship under adverse influences. The convexly curved portions 92 along the inner edge of the contact pads allow the contact pads to slightly roll on the flange-like projection sealing surfaces when the flank members flex. Of course, the surfaces areas of the sealing surfaces 88 and 90 of the flange-like projection 80 are considerably larger than the surfaces area of the contact pads 74 and 76 to provide sufficient sealing surface area for maintaining the sealing relationship during relative position changes of the parts 18 and 22. The free end 86 of the flange-like projection extends into the intermediate channel a sufficient distance to prevent its withdrawal during relative movement of the movable parts. The flank members 68 and 70 extend a desired length from the retained end 62 to the contact pads 74 and 76. The predetermined length of the flank members 68 and 70 is sufficient to achieve rapid flexure under the influence of pressure surges and to accommodate relative position changes of the movable parts. The exterior surface area of the flank members is determined primarily by their length, and that external surface area is preferably sufficiently large to deflect inwardly under pressure surges an amount which will not remove the curved portion 92 of the contact pad from its sealing surface on the flanged projection. The inner surface 93 of the flank members extending from the curved portions 92 of the contact pads curves away from the sealing surfaces 88 and 90 a predetermined extent to avoid contact with the sealing surfaces 88 and 90 and the free end 86 when the flank members are deflected under pressure surges or during relative position changes. Contact of the inner surface 93 with the sealing surfaces 88 and 90 would pull or lever the contact pads away from the sealing surfaces 88 and 90. The volume occupied by the lubricant within the interior channel 72 is greater than the change in volume occurring during relative movement of the movable parts and during pressure surges. If part of the lubricant within the interior channel 72 is replaced by drilling fluid during the volume changes resulting from relative movement and pressure surges, the increased volume of lubricant within the channel assures that the drilling fluid is not completely forced past the first sealing relationship between the contact pad 76 and the sealing surface 90 and also past the second sealing relationship defined by the contact pad 74 and the sealing surface 88. Consequently, the interior volume of the intermediate channel is of a predetermined size to prevent drilling fluid from entering the lubricant space leading to the bearing assemblies. Of course, the previously described considerations take into account a predetermined maximum allowable amount of relative position change. The extent of the maximum allowable relative position change is the maximum allowable amount after which the structure of the bearing assembly or the relatively movable parts is in jeopardy or will cause rapid failure. Once position changes exceed the maximum amount, the integrity of the seal no longer remains important because the mechanical structure will fail shortly thereafter from causes other than seal assembly failure. Although the design considerations for the seal assembly 10 have been described primarily in conjunction with a drilling application, the same considerations apply for other types of use. In each application, however, the maximum amount of allowable position change can generally be calculated and observed, and the caliper seal assembly can be designed accordingly.

Another adverse condition over which the caliper seal assembly exhibits an improved operating capability is elevated temperature conditions. The flange-like projection acts as a heat radiator for dissipating heat created by the frictional movement of the contact pads on the sealing surfaces during the normal movement. The relatively large surface area of the flange-like projection dissipates the heat to the surrounding environment or to the movable part to which the flange-like projection is connected. In addition, the type of elastomer material used in the flank supporting structure can be selected based on useful properties such as performance at elevated temperatures, rather than mechanical-type properties. In prior art O-ring seals for drill bits, for example, the elastomer material must primarily be selected based on response characteristics to wear, tolerance and clearance changes and the like. The highly advantageous design structure of the caliper seal inherently achieves desirable improvement in mechanical response characteristics, as described. Material selection can thereby primarily emphasize heat performance and other characteristics, and secondarily consider the other, previously more important response characteristics typically required of prior art O-ring and elastomer-coated Belleville washer seals.

Figure 6:
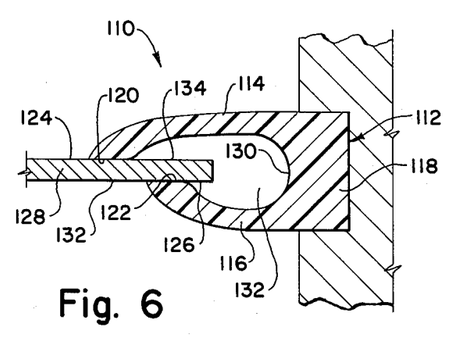
FIG. 6 is a cross sectional view of portions of an alternative embodiment of the caliper seal assembly illustrated in FIG. 2.

Another embodiment 110 of a caliper seal assembly, shown in FIG. 6, is particularly advantageous for dissipating heat generated by frictional movement of the contact pads on the sealing surfaces of the flange-like projection. A flank supporting structure 112 defines a pair of unequal length flank membes 114 and 116. The length of each flank member extends from the retained end 118 of the structure 112 to contact pads 120 and 122 formed on the terminal end portions of the flank members 114 and 116, respectively. The contact pads 120 and 122 contact sealing surfaces 124 and 126 of the flange-like projection 128 at offset positions. The offset positions are measured relative to a reference extending generally aligned with the extension of the flank members 114 and 116 and the flange-like projection 128. Consequently, the distance from the contact pad 120 to a centermost location or point 130 within the intermediate channel 132 and the distance from the contact pad 122 to the point 130 are different. The heat generated by each contact pad as it frictionally moves along the sealing surfaces 124 and 126 is applied to the flange-like projection at the annular points of contact by the contact pads. Because the contact pads are located at offset positions, the heat generated is not concentrated in the same area of the flange-like projection, but is applied over a larger area, thereby hastening the dissipation of the heat. The area 132 on the sealing surface 126 is immediately available to dissipate the heat created by the frictional movement of the contact pad 120 on the opposite sealing surface 124. Similarly, the area 134 quickly dissipates the frictionally generated heat from movement of the contact pad 122 on the opposite sealing surface 124. In contrast, the contact pads 74 and 76 of the previously described caliper seal embodiment 10 (FIG. 2) concentrate the frictionally generated heat at points directly transversely opposite one another on the flange-like projection 80. The concentrated and localized heat makes the dissipation of the heat more difficult because the heat must be conducted a greater distance through the flange-like projection. The contact pads 74 and 76 will generally experience a somewhat elevated temperature as compared to the temperature of the contact pads 120 and 122. However, even in the caliper seal embodiment 10, the heat dissipation is significantly improved from most commonly utilized seal assemblies, such as O-rings and elastomer-coated Belleville washers.

Figure 7:
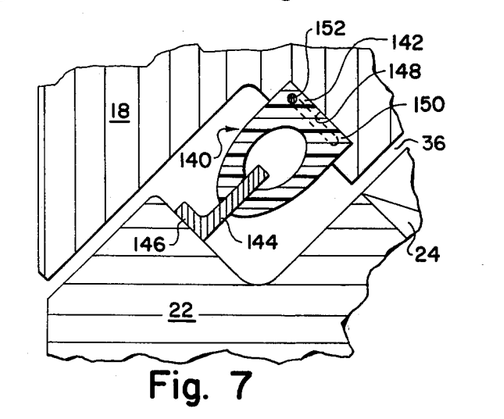
FIG. 7 is a view similar to that of FIG. 2 and illustrating an embodiment of the caliper seal assembly oriented 90° with respect to the orientation of the seal assembly shown in FIG. 2.

The advantages and features of the caliper seal assembly previously described are equally obtainable if the flange-like projection and the flank supporting structure are oriented in different relationships with respect to the relatively moving parts. For example, FIG. 7 illustrates an embodiment 140 of the caliper seal assembly in which the flank supporting structure 142 and the flange-like projection 144 are oriented perpendicularly with respect to the orientation illustrated in FIG. 2. Since the caliper seal responds to relative position changes of the two movable parts in two mutually perpendicular directions, while maintaining the normal moving sealing relationship in the third mutually perpendicular direction, the sealing relationship is unchanged by changing the direction of orientation of the seal assembly. Also shown in FIG. 7 is an alternative embodiment of 144 of the flange-like projection. The flange-like projection 144 is formed as an L-shaped cross section annular member and the smaller leg 146 of the flange-like projection 144 is welded or otherwise attached to the cutter wheel 22. Of course, a suitably shaped groove 148 is formed annularly in the drill bit leg portion 18 to receive the retained end 150 of the flank supporting structure 142. A wave spring 152 or other suitable retention means holds the end 150 in the groove 148.

Figure 8:
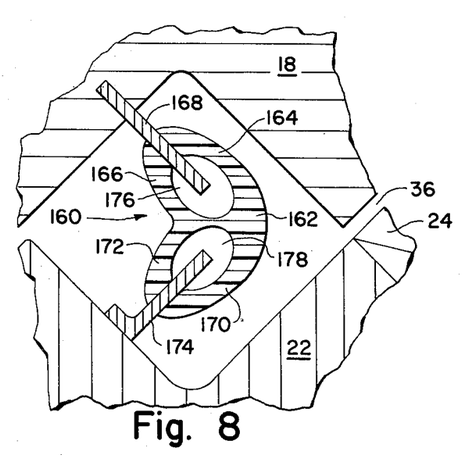
FIGS. 8 and 9 are views of further alternative embodiments of caliper seal assemblies according to the present invention, shown in the same general relationship and orientation as the caliper seal assembly shown in FIG. 2.

Another embodiment 160 of the caliper seal assembly which employs a floating flank supporting structure 162 is illustrated in FIG. 8. The annular structure 162 has a first bifurcated end defined by a first pair of generally aligned and flexible flank members 164 and 166 which receive a first annular flange-like projection 168 therebetween. The structure 162 also has a second bifurcated end defined by a second pair of flank members 170 and 172 which receive a second annular flange-like projection 174 therebetween. Contact pads and sealing surfaces are formed on the flank members and flange-like projections, respectively, in the manner previously described. Similarly, intermediate channels 176 and 178 are defined between the flank member pairs 164, 166 and 170, 172 respectively. The flange-like projection 168 is fixed and sealed to the leg portion 18, and the flange-like projection 174 is fixed and sealed to the cutter wheel 22. The structure 162 is retained by its annular mold or form configuration and its biased contacting sealing engagement with the flange projections 168 and 174 floats between the flange projections. The structure 162 will randomly or freely move with or relative to one or both of the flange projections 168 and 174 during normal relative movement of the parts 18 and 22. Random influences act on the structure 162, but the structure 162 will generally move relative to both of the flange-like projections at different times and under different conditions.

Figure 9:
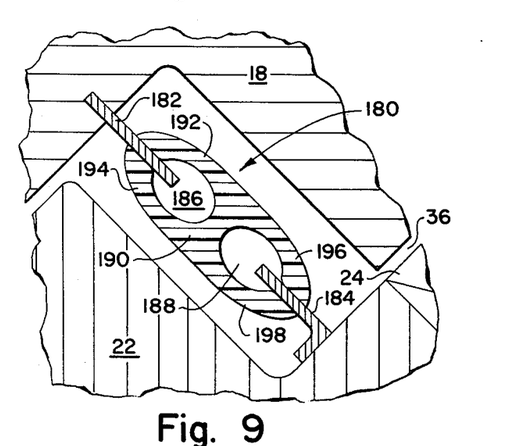

Another embodiment 180 of a floating caliper seal assembly is shown in FIG. 9. In the embodiment 170, the annular flange-like projections 182 and 184 are generally aligned with one another. The intermediate channels 186 and 188 of an annular flank supporting structure 190 are also generally aligned with one another and are positioned to receive the flange-like projections 182 and 184 therein and between flank member pairs 192, 194 and 196, 198, respectively. Again, the flank supporting structure 190 in the embodiment 180 indexes or moves randomly relative to one or both of the flange-like projections. The annular mold or form configuration and the biased sealing engagement of the structure 190 generally positions or retains it between the flange-like projections 182 and 184.

The floating caliper seal embodiments 160 and 180 shown in FIGS. 8 and 9 may be used in certain applications where the two-element caliper seal embodiments 10, 110 and 140 are not best utilized, such as where space, assembly or operating considerations are determinative. The design considerations previously discussed in conjunction with FIGS. 3, 4 and 5 are generally applicable to the floating embodiments 160 and 180, and will also generally dictate the choice between one of the different embodiments of the caliper seal assembly in each specific application.

Fluid-Cooled Caliper Seal

The caliper seal assembly offers substantial advantages with respect to cooling and removing excess heat. Excess heat is a particular problem because operating the seal assembly at elevated temperatures will rapidly decrease its life. One particular application where heat is a significant problem is in air drilling. In air drilling, air or a gaseous medium is used as the drilling fluid which removes the particle cuttings from the borehole. Because a gas is substantially less effective than a liquid in removing heat from the drill bit, an air drilling bit tends to operate at considerably elevated temperatures. It is typical practice with air drilling bits to not utilize sealed and lubricated bearings. Instead, passageways are formed from the drilling fluid cavity within the drill bit to the bearing clearance spaces and a supply of air is directed through the bearings. The air cools the bearings, tends to lubricate them and prevents the entry of particle cuttings because of the air flow and pressure through the bearings. U.S. Pat. No. 2,661,932 exemplifies a typical air drilling bit.

Figure 10:
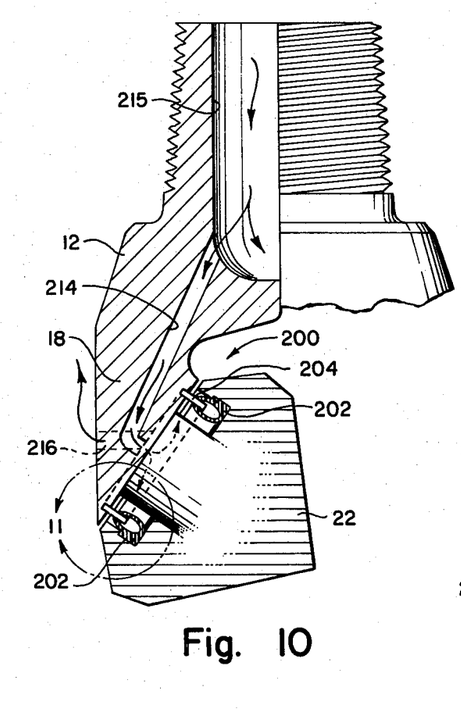
FIG. 10 is a generalized, fragmentized and partially cross sectioned side elevational view of a drill bit, illustrating one of the elements of another embodiment of the seal assembly according to the present invention.
Figure 11:
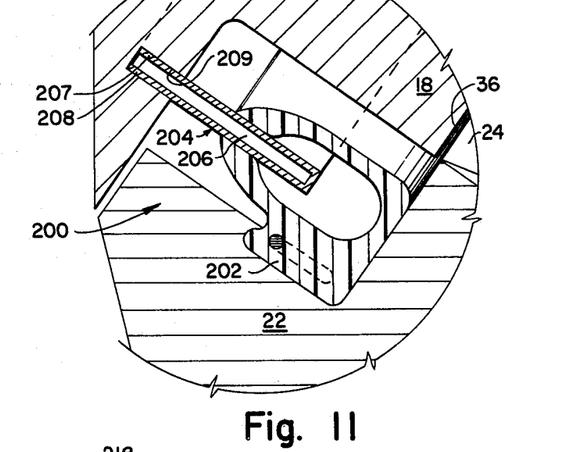
FIG. 11 is an enlarged view of the portion of FIG. 10 generally bounded by line 11—11.
Figure 12:
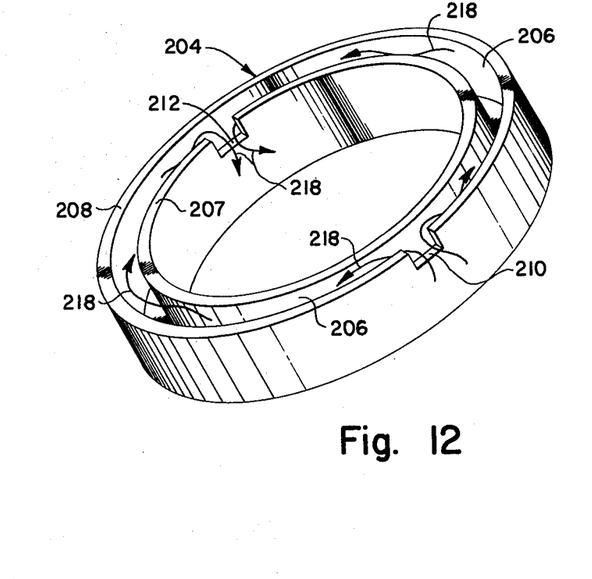
FIG. 12 is a perspective view of one element of the seal assembly illustrated in FIGS. 10 and 11, namely means defining a flange-like annular projection.

An air of fluid cooled embodiment 200 of the caliper seal assembly is illustrated in FIGS. 10, 11 and 12. The caliper seal embodiment 20 includes a typical flank supporting structure 202 operatively connected to and sealed with one of the relatively movable parts, for example the cutter wheel 22. A flange-like projection 204 is operatively connected to and sealed with the other of the movable part, for example the leg portion 18. The flange-like projection 204 is formed with a hollow fluid conducting interior conduit 206. The flange-like projection may actually be formed as an annular ring with a U-shaped cross sectional configuration, and the two free ends 207 and 208 of the U-shaped ring are pressed, welded or otherwise firmly attached in an annular notch 209 formed in the movable part 18. Means for passing fluid through the interior conduit 206 of the flange-like projection 204 take the form of an inlet relief 210 formed in the end 208 and an outlet relief 212 formed in the end 207, as shown in FIG. 12. A passageway 214 is drilled or otherwise formed through the bit body 12 between a center drilling fluid cavity 215 formed in the drill bit body and the inlet relief 210. The passageway 214 conducts the pressurized drilling fluid or gas present within the center annular opening of the drill string from cavity 215 to the interior conduit 206 of the flange-like projection 204. Another passageway 216 is formed in the drill bit leg portion 18 from the outlet relief 212 to the exterior of the drill bit. The passageway 216 conducts the fluid from the interior conduit 206 to the ambient environment after it has passed through the length of the interior conduit 206 along the path represented by arrows 218 shown in FIG. 12.

Because the pressure within the interior cavity 215 is greater than the pressure of the ambient environment where the outlet passageway 216 exits the drill bit body, a continual supply of fluid or gas is forced through the interior conduit 206. The air moving through the interior conduit continually cools the flange-like projection 204, and removes heat form the flange-like projection, the contact pads and the lubricant sealed within the seal assembly and lubricant cavity 36. The continual cooling avoids the premature deterioration of the contact pads, thereby substantially improving the useful lifetime of the caliper seal embodiment 200. The cooling effects improve the effectiveness of lubricating sealed bearings for attaching cutter wheels to air drilling bits. Although the application of the fluid cooled caliper seal 200 to an air drill bit has been illustrated, the seal assembly 200 may be applied to a variety of other drilling tools and mechanisms where heat removal is a desired feature.

Heat Pipe Seal Assembly

Figure 13:
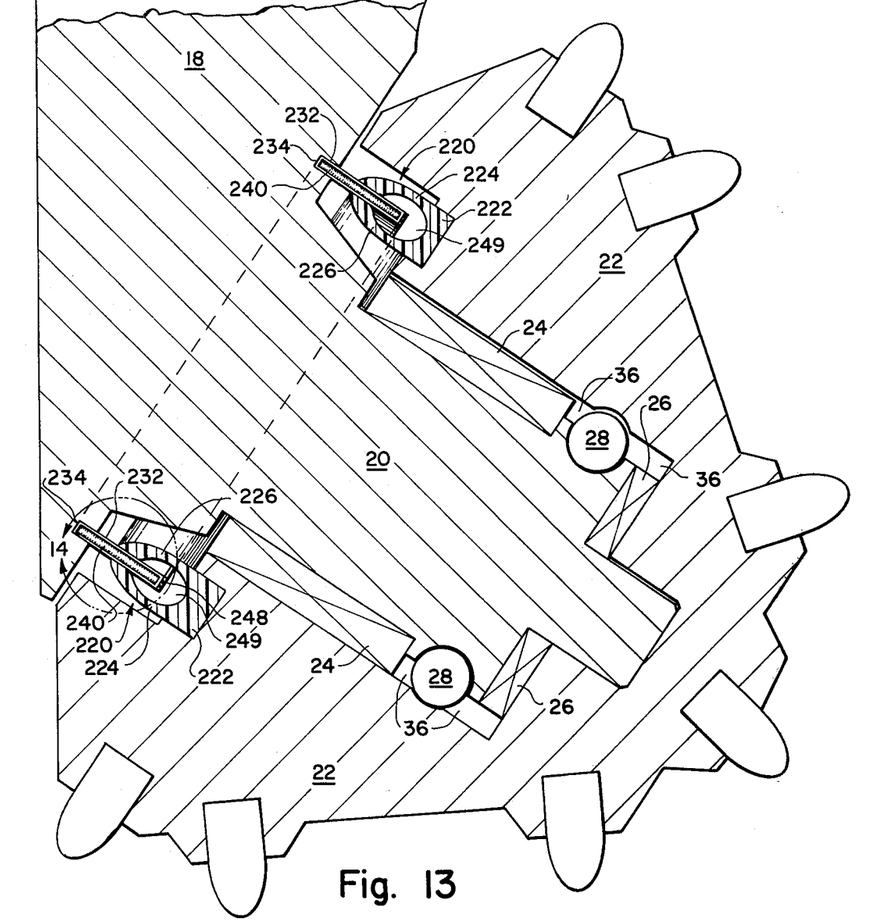
FIG. 13 is a cross sectional view of a portion of a drill bit to which a cutter wheel is attached, and illustrating a heat pipe embodiment of a seal assembly according to the present invention.
Figure 14:
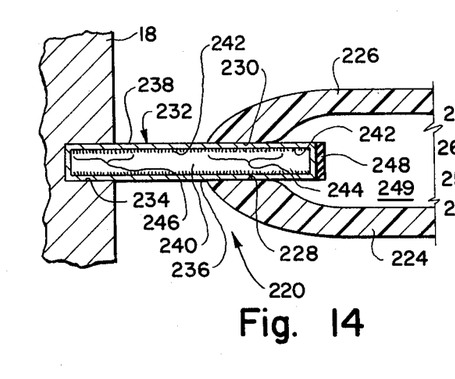
FIG. 14 is an enlarged view of the portion of FIG. 13 generally bounded by line 14—14.

Another embodiment 220 of the caliper seal assembly which exhibits high cooling capabilities is illustrated in FIGS. 13 and 14. The caliper seal assembly 220 includes the flank supporting structure 222 having a pair of flexible flank members 224 and 226. Contact pads 228 and 230 on the flank members 224 and 226, respectively, contact and move along the flange-like projection 232. The flange-like projection 232 is a ring-like annular structure and is pressed or welded into a correspondingly-shaped annular groove 234 formed in one of the movable parts, such as the leg portion 18 of the drill bit. Exterior surfaces 236 and 238 of the flange-like projection 232 present sealing surfaces along which the contact pads 228 and 230 maintain a movable sealing relationship. A hermetically sealed interior chamber 240 is formed within the interior of the flange-like projection 232. Wick material 242 is attached to the side walls of the interior chamber 240 and extends generally parallel to the exterior sealing surfaces 236 and 238. After the wick material 242 has been attached to the interior walls of the chamber 240, a charge of appropriate working fluid is inserted into the sealed interior chamber before it is hermetically sealed. In the sealed interior chamber the working fluid permeates the wick material 242 as a fluid and exists as a gas in the open center of the chamber 240. Design of the wicking system must, in the case of a rotating structure such as a drill bit, consider the centrifugal force resulting from rotation. The flange-like projection 232 is initially formed as a number of component parts, and access to the interior chamber 240 to insert the wick material and charge of working fluid is gained before the components parts are sealed together to form the integral flange-like projection 232 containing the hermetically sealed chamber. The flange-like projection, the hermetically sealed chamber, the wick material, and the charge of working fluid form a conventional heat pipe assembly or means.

A heat pipe is a well known heat transfer means which has the capability of conducting as much as 500 to 1,000 times as much heat as a solid copper conductor of approximately the same size. In the heat pipe illustrated in FIGS. 13 and 14, a section 244 acts as an evaporator section. The contact pads 228 and 230 adjoin the evaporator section 244, and the relative normal movement of the contact pads over the sealing surfaces 236 and 238 adds thermal energy to the evaporator section 244. The thermal energy input from the frictional movement of the contact pads causes the liquid working fluid in the wick material to go into a vapor, and the vapor is conducted through the hollow open vapor core of the interior chamber 240 to a condenser section 246 of the heat pipe. In the condenser section 246, the vapor working fluid condenses into a liquid and tranfers the heat of vaporization to the end of the flange-like projection retained in the movable part 18. The condensed fluid flows back through the wick material 242 to the evaporator section 244. The described process continues and heat energy is continually conducted from the evaporator section 244 to the condenser section 246. A small piece of insulation material 248 is added to the terminal free end of the flange-like projection 232. The insulation material 248 inhibits heat influx to the heat pipe assembly except in the area of the evaporator section 244 where heat is added by the frictional movement of the contact pads 228 and 230 on the sealing surfaces 236 and 238.

The high heat transfer capability of the heat pipe assembly rapidly transfers the heat generated by the frictional contact of the contact pads with the sealing surfaces into the considerably larger heat sink provided by the leg portion 18 of the drill bit. The contact pads 228 and 230, which are preferably of an elastomer material, operate at considerably cooler temperatures due to efficient heat transfer. The cooler operating temperature prolongs the life of the contact pads and maintains the effective sealing relationship for an extended lifetime of use, even in geothermal drilling. In geothermal drilling, prior art seal assemblies have not proved effective for a reasonably beneficial length of time, primarily because of the failure of the seal assembly during use. The sealing problems have proved so substantial that geothermal drill bits with sealed lubricated bearings are not regarded as successful. The heat pipe embodiment 220 of the caliper seal assembly exhibits enhanced capability for a reasonable lifetime of performance in the geothermal drilling environment, and should prove that lubricated sealed bearings can be successful in geothermal drilling.

Figure 15:
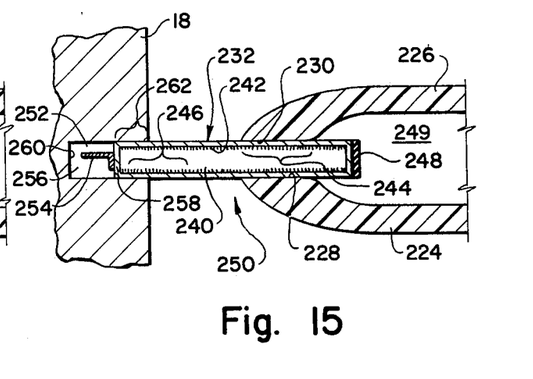
FIG. 15 is a view related to FIG. 14 illustrating another embodiment of the seal assembly of the seal assembly shown in FIGS. 13 and 14.

Another embodiment 250 of the heat pipe caliper seal assembly is illustrated in FIG. 15. The flange-like projection 232, the flank supporting structure defining the flank members 224 and 226, and the heat pipe assembly are similar to that which has previously been described in conjunction with FIGS. 13 and 14. Differences in the embodiment 250 include an enlarged annular groove 252 formed in the movable part 18 and a heat radiating fin 254. The annular groove 252 extends to a depth into the movable member 18 past the terminal retained end 258 of the flange-like projection 232. Accordingly, an open space 256 exists between the terminal end 258 of the flange-like projection and the innermost wall 260 of the groove 252. The flange-like projection 232 is connected to the member 18 in the areas 262. The heat radiator fin 254 is fastened in a thermally conductive manner to the end 258 of the heat pipe flange-like projection 232. The fin 254 extends into the space 256. A heat removing or cooling fluid is forced through the space 256 and removes heat from the radiator fin 254 and from the area of the movable part 18 surrounding the condenser section 246 of the heat pipe. The space 256 is an annular conduit extending in contact with the full extent of the end 258 of the flange-like projection and heat pipe assembly, and the annular conduit defined by the space 256 is similar in function to the conduit 206 previously described in conjunction with FIG. 10. A supply of cooling fluid is preferably directed through a passageway (not shown) to an inlet to the conduit space 256, and another passageway (not shown) conducts the heated fluid out of the conduit space 256 to the ambient environment of the drill bit. Depending on the type of drilling, the cooling fluid forced through the conduit opening 256 may either be gas or liquid. The fluid cooled condenser embodiment of the heat pipe caliper seal assembly shown in FIG. 15 will be best utilized in those applications where the heat sink capability of the leg portion 18 of the drill bit itself, shown in FIGS. 13 and 14, is insufficient to provide enough cooling for the seal assembly.

Positive Indexing Intermediate Seal Assembly

A caliper seal assembly is one type of seal means which may be effectively utilized with a positive indexing bearing assembly of the type described in the aforementioned copending U.S. patent application Ser. No. 95,532, now U.S. Pat. No. 4,240,674, by the Inventor herein. Although described more completely in this copending application and U.S. Patent, one type of positive indexing bearing assembly 270 will be briefly described in conjunction with FIG. 16. The positive indexing bearing assembly 270 is shown utilized in a rotary drill bit 271 having the typical leg portion 18 and the cutter wheel 22. The journal pin 20 extends from the leg portion into an interior opening 272 withing the cutter wheel 22. Conventional ball bearing assemblies 28 and an axial thrust bearing assembly 26 operate in conjunction with the positive indexing bearing assembly 270 to rotationally connect the cutter wheel 22 to the journal pin 20. The positive indexing bearing assembly 270 is operative between the exterior raceway 30 of the journal pin and the interior raceway 29 of the cutter wheel 22. The cutter wheel and the journal pin thus define a pair of relatively movable race members.

Figure 16:
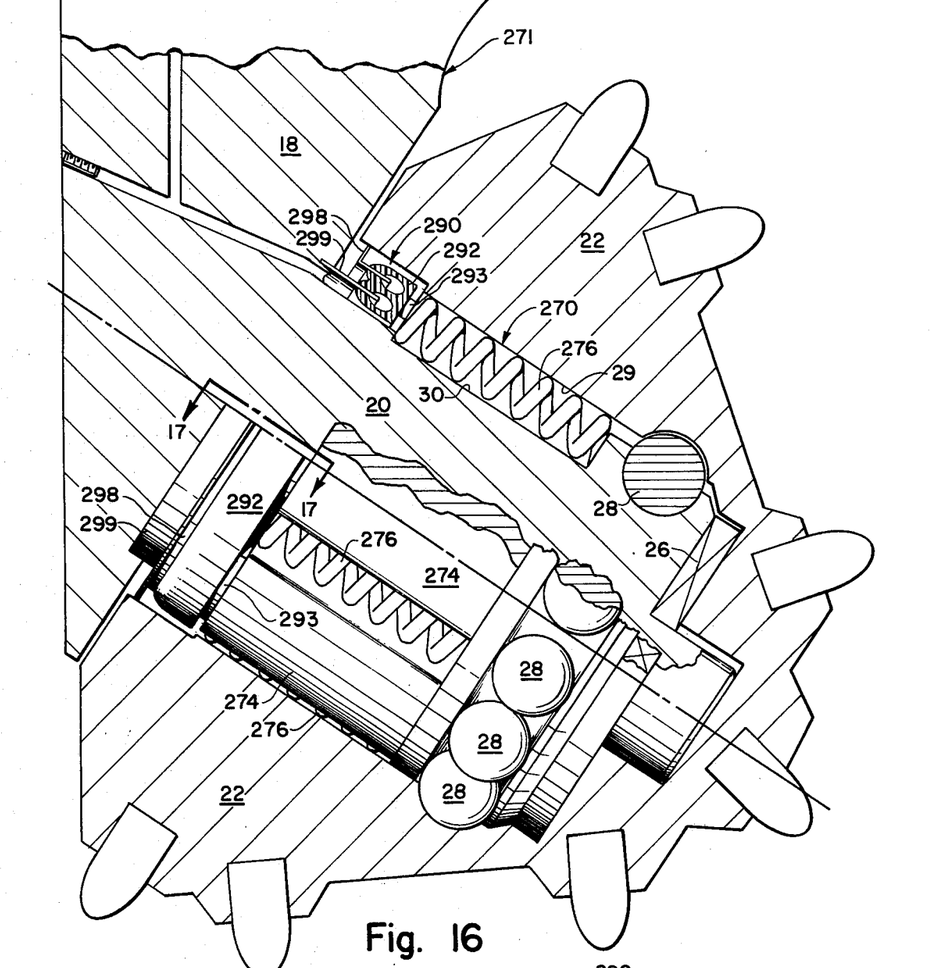
FIG. 16 is a cross sectional view of a portion of a drill bit illustrating an embodiment of a caliper seal assembly operatively connected for movement in conjunction with a relatively moving element of a positive indexing bearing assembly incorporated in the drill bit.

The positive indexing bearing assembly 270 includes a plurality of load bearing segments 274. Means for indexing the load bearing segments 274 over and relative to both raceways 29 and 30 during relative rotation of the cutter wheel 22 and the journal pin 20 take the form of one or more roller members such as helically wound coil springs 276. The coil springs 276 extend between the raceways 29 and 30 under a predetermined amount of compression. The compression force engages each of the coils of the springs 276 into a firm contacting relation with the raceways. During relative rotation of the journal pin and the cutter wheel, the coil springs 276 move over both raceways 29 and 30 with movement relative to both raceways. The predetermined amount of compression of the springs 276 between the raceways causes sufficient frictional contact with the raceways to index or push the load bearing segments 274 relative to both relatively rotating race members. The relative movement of the load bearing segments allows higher operational speeds under heavy load, among other advantages. In addition, load bearing segments 274 substantially increase the load bearing capability of the bearing assembly 270 because the load bearing surface areas of the segments are preferably of substantial size to distribute the force rather than concentrate it on a point or line. The load bearing segments 270 may be formed as separate, discrete elements as shown in FIG. 16 or as a unitary sleeve member 278 shown in FIG. 18. The sleeve-like load bearing member 278 includes a plurality of openings 280 formed completely through the radial thickness of the sleeve member 278. Individual spring roller members 282 are positioned within the openings 280 and extend between the raceways of the bearing assembly. The roller members 282 collectively achieve sufficient indexing force to move the whole sleeve member 278 relative to both raceways during relative rotation of the race members.

Figure 17:
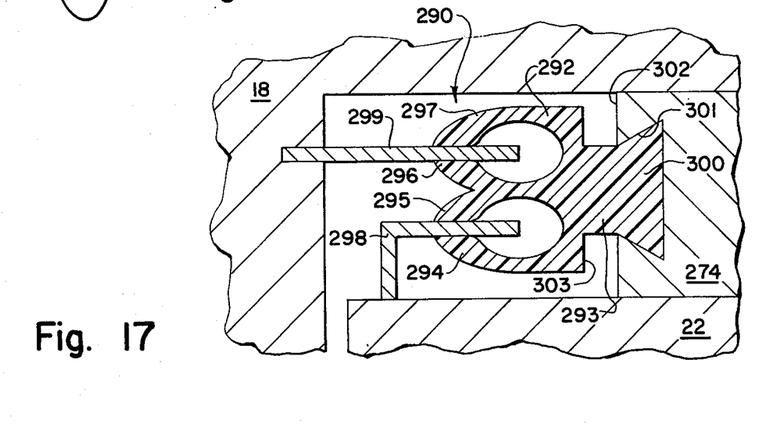
FIG. 17 is an enlarged view of the portion of FIG. 16 generally bounded by line 17—17.

An embodiment 290 of a caliper seal assembly adapted for use in a bearing assembly, e.g. 270, having an intermediate relatively moving element, e.g. 274 or 278, is shown in FIGS. 16 and 17 to include a flank member supporting structure 292 operatively connected to one or more of the intermediate relatively moving elements. One or more flexible extensions 293 extend from the flank supporting structure 292 and connects the structure 292 to the relatively moving element. The flank supporting member defines two pairs of flank members 294, 295 and 296, 297. The pair of flank members 294 and 295 operatively contacts the sealing surfaces of a first flange-like projection 298. The pair of flank members 296 and 297 operatively contacts the sealing surfaces of a second flange-like projection 299. The first flange-like projection 298 is operatively connected to and sealed with the cutter wheel 22 and the second flange-like projection 299 is operatively connected to and sealed with the leg portion 18 of the drill bit. The flank members 294, 295, 296 and 297 operate with respect to the flange-like projections 298 and 299 in the same manner as has been previously described. The extensions 293 move the flank supporting structure 292 in conjuction with the intermediate relatively moving element, e.g. 274 or 298. The flank member pairs 294, 295, and 296, 297 each move relative to the flange-like projections 298 and 299 with which they respectively contact. The movement of the flank supporting structure relative to each relatively moving race member, e.g. 18 and 22, causes the normal relative movement rate of each of the contact pads on the flange sealing surfaces to be less than the rate of relative movement between the race members. The heat generated by the frictional contact of the contact pads on the flange sealing surfaces of each caliper seal assembly is reduced, thereby prolonging the life of the seal assembly.

When the flank supporting structure 292 is connected to the discrete load bearing segments 274, the extensions 293 are relatively flexible to allow certain amounts of relative circumferential position change of the individual load bearing segments 277. As described more fully in the aforementioned U.S. Pat. No. 4,240,674, the clearance between the raceways in a drill bit bearing assembly changes after use, and the clearance change generally causes the individual load bearing segments 274 to experience relative circumferential interval position change with respect to the preceding and following load bearing segments at different points in their movement through the annular space between the raceways. The slight expansion and contraction of the compressed spring members 276 increases the relative circumferential interval between load bearing segments 274 when the clearance between the raceways increases and slightly decreases the relative circumferential interval between the segments 274 when the clearance between the raceways decreases.

As illustrated in FIG. 17, the extension 293 of the flank supporting structure 292 includes a trapezoidal-shaped end connection 300 extending within a complementary-shaped groove 301 formed in the end 302 of the load bearing segments 274. The trapezoidal-shaped end 300 will generally retain the flank supporting structure 292 to the end 302 of the bearing segment 274, but other fastening means can also be employed if desired.

Figure 18:
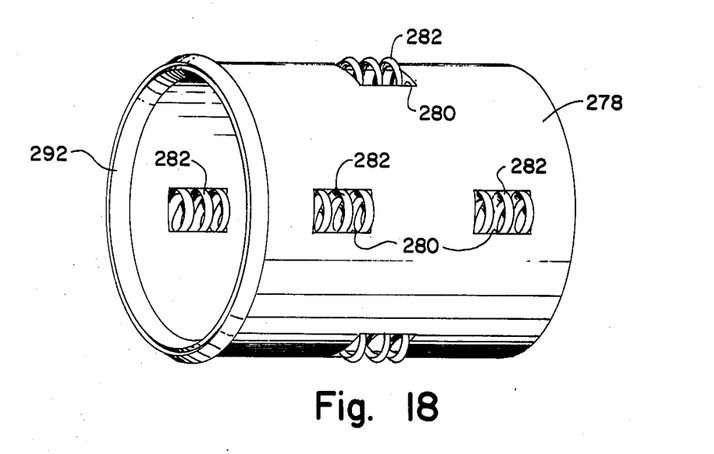
FIG. 18 is a perspective view of a sleeve-like structure defining a plurality of unitarily connected load bearing segments to which a flank member supporting structure is connected at one annular end. The elements illustrated in FIG. 18 may be alternatively employed for the discrete intermediate load bearing elements of the positive indexing bearing assembly illustrated in FIG. 16.

The flexible extension 293 can also be used to connect the flank supporting structure 292 to the annular end of the sleeve-like unitary load bearing segment 278 (FIG. 18). However it is also possible to eliminate the extension 293 and abut the flat end shoulder 303 (FIG. 17) directly against the annular end of the sleeve-like load bearing segment 278, in which case the trapezoidal-shaped end 300 extends directly from the shoulder 303 without separation by the extension 293. The shoulder 303 will thereby be held in abutted relation to the annular end of the sleeve-like bearing segment. (The annular end of the sleeve-like bearing segment 278 would correspond to the end 302 of the discrete bearing segment 274 shown in FIG. 17.)

It should be apparent from the foregoing descriptions of the caliper seal embodiment 290 that the caliper seal embodiments 160 and 180 shown in FIGS. 8 and 9 can also be similarly utilized. However, in application of the embodiments 160 and 180 to a positive indexing bearing assembly, connection means similar to the elements 293, 300 and 302 (FIG. 17), must extend between the flank supporting structures 162 and 190 and the intermediate relatively moving member of the bearing assembly.

Figure 19:
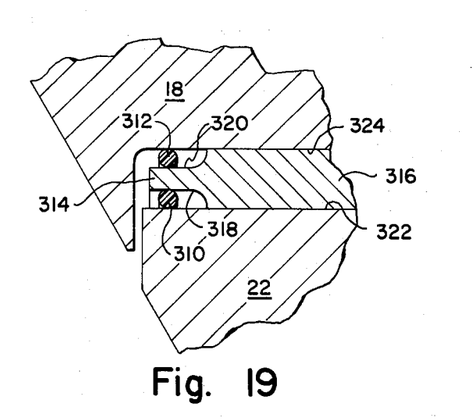
FIGS. 19, 20 and 21 are fragmentary cross sectional views of alternative embodiments of seal assemblies according to the present invention adaptable for use with a positive indexing bearing assembly employing an intermediate element. The views of FIGS. 19, 20 and 21 are taken generally in the same location as the location of the view of FIG. 18.
Figure 20:
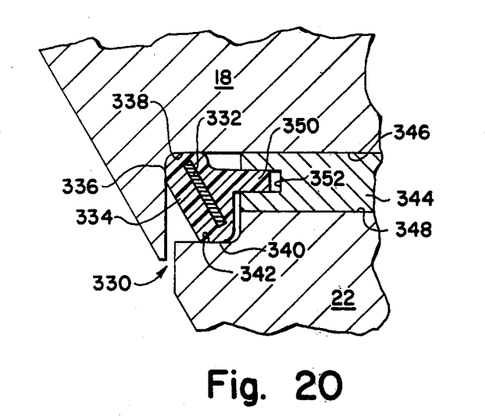
Figure 21:
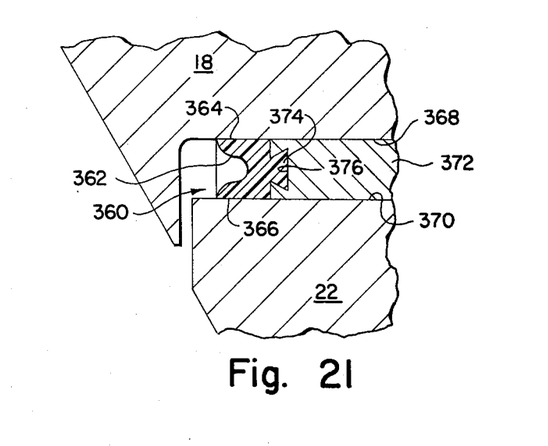

In addition to the caliper seal embodiments 160, 180 and 290, other types of seals may also be utilized with the bearing assembly involving intermediate relatively moving elements. FIGS. 19, 20 and 21 illustrate different embodiments of alternative seals.

A pair of O-ring seals 310 and 312 are utilized in the seal assembly illustrated in FIG. 19. A lip 314 extends between the O-rings 310 and 312 from the intermediate relatively moving element 316 of the bearing assembly. The lip 314 defines two sealing surfaces 318 and 320 extending parallel to the raceways 322 and 324 of the relative moving parts such as the leg portion 18 and the cutter wheel 22 of a drill bit. The O-ring 310 is under a predetermined amount of radial compression between surfaces 318 and 322, and the O-ring 312 is similarly compressed between surfaces 320 and 324. The sealing surfaces 318 and 320 are of width greater than the diameter of the O-rings 310 and 312, the width being the left to right dimension as shown in FIG. 19. The width of the surfaces 318 and 320 is sufficient to allow the O-rings to roll along the surfaces 318 and 320 under the influence of pressure surges. Rolling movement of the O-rings under pressure surges in drill bits is well known and is desirable to assure proper lubrication and an increased lifetime of use.

An embodiment 330 utilizing a Belleville spring type interior disc 332 to which an elastomer sealing material 334 has been molded is illustrated in FIG. 20. One sealing surface 336 of the elastomer material 334 contacts and maintains a movable sealing relation with a sealing surface 338 of one movable part such as the leg portion 18. Another sealing surface 340 of the elastomer material 334 maintains a movable contacting and sealing relationship with a sealing surface 342 of another movable part such as the cutter wheel 22. The seal embodiment 330 is moved relative to both moving parts 18 and 22 by its retained connection with the intermediate relatively moving element 344 which is positioned between raceways 346 and 348 of the movable parts. A flexible thin elastomer extention 350 extends between the seal embodiment 330 and the intermediate element 344, and is retained within a notch 352 formed in the intermediate element 344. A number of the tabs (not shown) extend perpendicularly with respect to the extension 350 and into notches (also not shown) in the intermediate element 344 and thereby form means for retaining the seal embodiment 340 to move in conjunction with the intermediate element 244. The depth of the notch 352 and length of the extension 350 allow the seal embodiment to move to the left and right along surfaces 338 and 342, as shown in FIG. 20, under the influence of pressure variations.

A U-cup seal embodiment 360 is shown in FIG. 21. The U-cup seal is of construction utilizing an exterior U-shaped curved surface configuration 362 to which external pressure is applied. Relatively straight sealing surfaces 364 and 366 extend into contacting movable sealing relationship with raceways 368 and 370 of two relatively moving parts 18 and 22. An intermediate relatively moving element 372 is positioned between the raceways of the two movable parts, and the intermediate relatively moving element 372 is connected to and carries the U-cup seal 360. A trapezoidal-shaped extension 374 of elastomer material extends from the U-cup seal 360 into a correspondingly-shaped notch 376 formed in the annular terminal end of the intermediate element 372. During relative rotation of the two movable parts 18 and 22, the seal 360 is moved relative to both raceways 368 and 370 due to its connection to the intermediately moving element 372.

The intermediate relatively moving seal embodiments shown in FIGS. 20 and 21 can be adapted for use with embodiments of the positive indexing bearing assembly which employ discrete intermediate elements. The sealing member is connected to each of the discrete intermediate elements in much the same manner as has been previously described. The seal embodiment shown in FIG. 19, however, depends on a continuous annular lip 314 to complete the seal.

In the seal embodiments described and illustrated in FIGS. 16 to 21, it is apparent that at least one individual seal is maintained with each relatively moving part and that the seal assembly itself moves at an intermediate relative rate. Each individual seal experiences substantially less wear and frictional heat build-up because of its intermediate movement. Consequently, improved seal life results, and the usable lifetime of the bearing assembly is increased due to the better lubricant containing capability of the seal assembly.

The seal embodiments, lubrication systems, processes and improvements resulting from the present invention have been shown and described with a degree of specificity. It should be understood, however, that the specificity of the description has been made by way of preferred example and that the invention is defined by the scope of the appended claims.

What I claim is:

1. In combination with a drill bit, which includes a cutter wheel rotatably connected by a bearing assembly to a body element of the drill bit, a caliper seal assembly operatively extending between the cutter wheel and the bit body to seal the bearing assembly from the ambient environment of the bit, said caliper seal assembly comprising:
    a first structure having a bifurcated end defined by a pair of flexible flank members separated by an intermediate channel, each flank member including a contact pad formed thereon facing into the intermediate channel; and
    means defining a flange-like projection extending into the intermediate channel of said first structure, said flange-like projection including a pair of sealing surfaces, each sealing surface being positioned in contacting and movable sealing relation with a different contact pad.

2. An invention as defined in claim 1 wherein:
    each contact pad defines a sealing surface adapted to contact the sealing surface of the flange-like projection, and the sealing surface of the contact pad includes a portion which is convexly curved away from the sealing surface of said flange-like projection to maintain sealing contact with the sealing surface of the flange-like projection during flexure of the flank members.

3. An invention as defined in claim 2 wherein:
    the convexly curved portion is located along an inner edge of the contact pad sealing surface oriented toward an innermost location within the intermediate channel.

4. An invention as defined in claim 1 further comprising:
    heat pipe means extending from within the interior of said flange-like projection.

5. An invention as defined in claim 4 wherein said heat pipe means includes an evaporator section positioned adjacent points on said flange-like projection contacted by said contact pads.

6. An invention as defined in claim 1 further comprising:
    a fluid conducting conduit extending within the interior of said flange-like projection; and
    means for passing fluid through said conduit.

7. An invention as defined in claim 1 wherein:
    the contact pads of the flank members are located at positions off-set from one another relative to a reference extending generally aligned with the flank members.

8. An invention as defined in claim 1 wherein:
    each contact pad is positioned at the terminal end of each flank member; and
    the length of each flank member from an innermost position of the intermediate channel to the contact pad of each flank member is different.

9. An invention as defined in claim 1 further comprising:

means operatively interconnecting said bit body and said cutter wheel for moving said first structure relative to said cutter wheel and to said bit body during rotation of said cutter wheel.

10. An invention as defined in claim 1 wherein:
    one of said first structure or said flange-like projection defining means is operatively connected to said cutter wheel; and
    the interior volume of the intermediate channel unoccupied by said flange-like projection interiorly of the contact pads is greater than an anticipated volume change resulting from movement of said flange-like projection relative to said first structure due to axial and radial movement of said cutter wheel relative to said bit body occurring after a predetermined period of wear from use.

11. A seal assembly operatively positioned between a pair of relatively movable comprising:
    a flank member operatively connected to one of said relatively movable members, said flank member including a sealing contact surface formed thereon;
    a projection operatively connected to the other of said relatively movable members, said projection including a sealing surface formed thereon in movable sealing relation with the sealing contact surface of said flank member;
    heat pipe means extending from within the interior of said projection for removing heat from said projection;
    said heat pipe means further including an evaporator section positioned within the interior of said projection in an area adjoining each point at which the sealing contact surface of each of said flank member contacts each sealing surface of said flange-like projection;
    said heat pipe means further including a condenser section positioned remote from each point at which the sealing contact surface of each said flank member contacts each sealing surface of said flange-like projection;
    the condenser section of said heat pipe means positioned in a thermally conductive relationship with one of said relatively movable members;
    the seal assembly in an improved combination with a drill bit suitable for extended use in drilling for the production of geothermal energy, said drill bit comprising a bit body, a cutter wheel, a lubricated bearing assembly operatively connecting the cutter wheel for rotation with respect to the bit body, and wherein:
    one of said relatively movable members comprises the bit body;
    the other of said relatively movable members comprises the cutter wheel; and
    said seal assembly operatively seals said lubricated bearing assembly from the ambient environment of said bit.

12. An invention as defined in claim 11, wherein:
    said flange-like projection has the form of an annular flange-like ring, and the annular ring extends from said bit body;
    each said flank member is operatively connected to the cutter wheel;
    the condenser section of said heat pipe means is located in contact with the bit body; and
    said drill bit further comprises passageway means within said bit body for conducting fluid to the condenser section of said heat pipe means.

13. A seal assembly operatively positioned between a pair of relatively movable members, comprising:

a flank member operatively connected to one of said relatively movable members, said flank member including a sealing contact surface formed thereon;

a projection operatively connected to the other of said relatively moving members, said projection including a sealing surface formed thereon in movable sealing relation with the sealing contact surface of said flank member;

a fluid conductive conduit defined by and extending interiorly within said projection;

means for conducting fluid through said conduit;

first structural means defining a pair of said flank members separated by an intermediate channel, each flank member including one said sealing contact surface formed thereon facing into the intermediate channel;

second means defining a flange-like projection extending into the intermediate channel, said flange-like projection including a pair of said sealing surfaces, each sealing surface being positioned in contacting and movable sealing relation with a different one of said sealing contact surfaces of said flank members;

the seal assembly in combination with a drill bit suitable for use in gaseous fluid drilling, said drill bit comprising a bit body, a cutter wheel, a lubricated bearing assembly operatively connecting the cutter wheel for rotation with respect to the bit body and a cavity in the bit body within which gaseous fluid is supplied, and wherein:

one of said relatively movable members comprises the bit body;

the other of said relatively movable members comprises the cutter wheel;

said seal assembly operatively seals said lubricated bearing assembly from the ambient environment of said bit;

said means for conducting fluid through said conduit comprises:

an inlet port to said conduit;

an outlet port from said conduit, said outlet port positioned with respect to said inlet port to define a fluid communication path within said flange-like projection;

first passageway means extending from said cavity through the bit body to the inlet port of said conduit; and second passageway means communicatively extending from the outlet port to the ambient environment exterior of said bit body.

14. A sealed bearing assembly, comprising:

means defining a pair of movable members operatively retained for movement relative to one another, each movable member defining a raceway, the raceways of the pair of movable members being positioned in spaced apart and opposing confronting relation;

at least one intermediate element movably positioned intermediate the raceways;

interconnecting means operatively interconnecting at least one of said movable members and said one intermediate element for moving said one intermediate element relative to both raceways during relative movement of said movable members;

a seal assembly operatively extending between said movable members in a movable sealing relation, said seal assembly including at least one seal element; and connecting means operatively connecting said one seal element to said one intermediate element for moving said one seal element relative to both movable members during movement of said one intermediate element relative to both said movable members.

15. A sealed bearing assembly as defined in claim 14 wherein:

said movable members are operatively retained for relative movement in a preferred direction; and said one seal element and said connecting means cooperatively maintaining the movable sealing relation of said seal assembly during a predetermined finite amount of movement of said movable members in two directions different from and mutually perpendicular to the preferred direction of relative movement of said movable members.

16. A sealed bearing assembly as defined in claim 14 of the rotary type, wherein:

said one intermediate element comprises means defining a plurality of load-bearing segments movably positioned in an annular configuration intermediate the raceways, each of said load-bearing segments having bearing surfaces adjoining both raceways, the bearing surfaces adjoining the raceways over surfaces substantially greater than a point contact or a line contact.

17. A sealed bearing assembly as defined in claim 16 wherein:

said one seal element is operably connected to at least one load-bearing segment;

at least two of said load-bearing segments are spaced apart separately from one another; and said interconnecting means comprises a roller member positioned within the space between said two spaced-apart load-bearing segments and extending between said raceways under a predetermined amount of compression.

18. A sealed bearing assembly as defined in claim 16 wherein:

said means defining a plurality of load-bearing segments positioned in an annular configuration comprises an annular sleeve member positioned between the raceways;

said one seal element is operably connected to an axial annular end of said sleeve member, said annular sleeve member defines at least one opening radially therethrough between said raceways; and said interconnecting means comprises a roller member positioned within the opening in the annular sleeve and extending between said raceways under a predetermined amount of compression.

19. A sealed bearing assembly as defined in claims 17 or 18 wherein the seal assembly comprises a caliper seal, and said caliper seal comprises:

a first annular structure having a bifurcated end defined by a pair of flexible elastomeric flank members separated by an intermediate channel, each flank member including a contact pad formed thereon facing into the intermediate channel; and an annular flange-like projection extending into the intermediate channel of said first structure, said flange-like projection including a pair of sealing surfaces, each sealing surface being positioned in contacting and movable sealing relation with a different contact pad; and wherein:

one of said first structure or said flange-like projection is said one seal element of said seal assembly.

20. A sealed bearing assembly as defined in claim 19 operatively interconnecting a cutter wheel to a bit body in a drill bit.

* * * * *